(12) United States Patent
Izawa et al.

(10) Patent No.: US 6,208,920 B1
(45) Date of Patent: Mar. 27, 2001

(54) TIRE CONTACT LOAD CONTROL SYSTEM

(75) Inventors: Masaki Izawa; Yasuo Shimizu; Kei Oshida; Hideaki Shibue, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/040,081

(22) Filed: Mar. 17, 1998

(30) Foreign Application Priority Data

| Mar. 19, 1997 | (JP) | ................................................ | 9-066312 |
| Mar. 21, 1997 | (JP) | ................................................ | 9-068789 |
| Apr. 8, 1997 | (JP) | ................................................ | 9-089199 |
| Apr. 23, 1997 | (JP) | ................................................ | 9-106111 |

(51) Int. Cl.[7] ............................. B60G 17/00; B60G 11/26
(52) U.S. Cl. ................................ 701/36; 701/38; 280/5.5
(58) Field of Search ................................ 701/36, 37, 38, 701/48, 69, 70, 71, 72, 73, 80, 89; 280/5.5, 5.504, 5.514, 5.512, 5.513, 124.157, 5.507, 5.52, 5.506, DIG. 1

(56) References Cited

U.S. PATENT DOCUMENTS

| 4,625,993 | * | 12/1986 | Williams et al. | ................. | 280/707 |
| 4,761,022 | * | 8/1988 | Ohashi et al. | ................. | 280/772 |
| 4,809,179 | * | 2/1989 | Klinger et al. | ................. | 364/424.05 |
| 5,276,624 | * | 1/1994 | Ito et al. | ................. | 364/424.05 |
| 5,351,985 | * | 10/1994 | Ando et al. | ................. | 280/675 |
| 5,445,405 | * | 8/1995 | Onozawa et al. | ................. | 280/707 |

* cited by examiner

*Primary Examiner*—Tan Nguyen
*Assistant Examiner*—Dalena Tran
(74) *Attorney, Agent, or Firm*—Carrier Blackman & Associates, P.C.; Joseph P. Carrier; William D. Blackman

(57) ABSTRACT

An active actuator is interposed between the unsprung mass and the sprung mass of a vehicle, and a controller selectively extends and retracts the actuator at a prescribed acceleration so as to selectively apply an additional contact load to the wheel by making use of the inertial force of the sprung mass and/or the unsprung mass of the vehicle. Thus, the tire contact load of each wheel can be increased at will and independently from the other wheels so that the gripping force available to each wheel can be increased as required by appropriately operating the corresponding actuator. Therefore, the braking performance and the accelerating performance for the given road condition can be improved. Additionally, even when a frictional coefficients for the right and left wheels differ from each other, by appropriately applying an additional contact load to the wheel travelling over the more slippery part of the road surface, the stability of the vehicle can be also substantially increased.

17 Claims, 15 Drawing Sheets

TIRE CONTACT LOAD CONTROL SYSTEM

TECHNICAL FIELD

The present invention relates to a tire contact load control system for increasing the road wheel contact pressure on the road surface as needed by actuating an actuator interposed between the sprung mass and the unsprung mass of the vehicle at a certain acceleration.

BACKGROUND OF THE INVENTION

The gripping force F of a tire can be given by the product of the frictional coefficient $\mu$ between the tire and the road surface and the vertical contact load W acting on the tire contact surface ($F=\mu W$). In other words, the tire contact load which plays an important role in the handling of the vehicle is proportional to the magnitude of the tire contact load for a given road condition.

In a known active wheel suspension system, a linear actuator which can be actively extended and retracted is typically installed between the vehicle body and each road wheel so that the distribution of tire contact load may be distributed to the four different road wheels according to a prescribed control mode. For instance, U.S. Pat. No. 4,625, 993 issued Dec. 2, 1986 to Williams et al. discloses an active wheel suspension system which controls the stroke of the hydraulic actuator provided with each road wheel so that the attitude of the vehicle body may be properly controlled when the vehicle is travelling. When the vehicle is travelling straight ahead, the tires are made to follow the irregular contour of the road surface so that the gravitational center of the sprung mass may be controlled or may stay at a relatively fixed height. When the vehicle is accelerating or decelerating, the load distribution between the front axle and the rear axle is appropriately changed so that the pitching movement of the vehicle may be controlled. When the vehicle is turning a curve, the load distribution between the right and left wheels is appropriately changed so that the rolling movement of the vehicle may be controlled.

According to such a conventional active wheel suspension system, the weight of the vehicle body was simply distributed between the different road wheels, and the sum of the contact pressures of the four road wheels was essentially constant. Therefore, such an active wheel suspension system was not able to increase the overall traction or braking force of the vehicle.

It is known that the maximum gripping force which optimizes the braking force and the traction force can be achieved when the slip ratio of the wheel is at a certain value. The slip ratio is given as a ratio of the difference between the circumferential speed of the tire and the vehicle speed to the vehicle speed. The ABS (antilock brake system) is based on this concept, and is now widely used in motor vehicles. However, the ABS system is not able to change the gripping force of the tire, and typically intermittently release the brake to avoid excessive slipping. In other words, the capability of the ABS system to reduce the braking distance of the vehicle is limited by the given traction force. It is therefore desirable if the gripping force itself can be increased in view of further reducing the braking distance.

The road gripping force of a tire is important also when accelerating a vehicle. When a vehicle is excessively accelerated for a given road condition, the tires start slipping, and not only is a desired acceleration prevented from being achieved, but also the lateral stability of the vehicle may be lost. By noting this problem, it has been proposed to control the traction force of each driven wheel so that the slip ratio of the wheel may be kept within a limit, and a maximum available traction may be obtained at all times. The traction control system is designed to carry out such a control action. However, the conventional traction control system is not able to increase the magnitude of the available traction, and simply reduces the torque transmitted to the wheels so as to prevent the slip ratio from exceeding a prescribed limit.

The frictional coefficient of the road surface for the tires may not be even, and the right and left wheels may travel over road surfaces of different frictional coefficients. This may be called as a split $\mu$ road surface. When a brake is applied to a vehicle travelling over such a road surface, the vehicle tends to swerve from a straight course, and may even go into a spin. To avoid such condition from occurring, an ABS system normally controls the braking force of each wheel so that the braking force of each of the wheels would not exceed that of the wheel experiencing the smallest frictional coefficient (see Japanese patent laid open publication No. 2-220958). This is beneficial in maintaining the lateral stability of the vehicle, but increases the braking distance of the vehicle. The same problem arises when an attempt is made to accelerate a vehicle traveling over a split $\mu$ road surface.

BRIEF SUMMARY OF THE INVENTION

With the foregoing limitations and disadvantages of the known systems in mind, the inventors have recognized that when a linear actuator interposed between a wheel and a vehicle body is either extended or retracted at a certain acceleration, a corresponding inertia force is produced in the sprung mass and the unsprung mass. The reaction of such an inertia force may be used to increase the contact load of the road wheel or the gripping force of the tire. Therefore, when this concept is applied to a traction control system, it is possible to increase the magnitude of the available traction. In particular, an optimum result can be achieved if the contact load of the wheel encountering a smallest frictional coefficient is increased. The same principle may also be applied in controlling the traction or the braking force of the vehicle traveling over a split $\mu$ road surface.

In view of such problems of the prior art and the recognition by the inventors, a primary object of the present invention is to provide a vehicle tire contact load control system which can selectively increase the tire contact load of each road wheel.

A second object of the present invention is to provide a vehicle tire contact load control system which can increase the gripping force of each road wheel for a given road condition.

A third object of the present invention is to provide a vehicle tire contact load control system which can increase the traction or the braking force for each road wheel for a given road condition.

A fourth object of the present invention is to provide a vehicle tire contact load control system which can improve the handling of a vehicle making a turn.

A fifth object of the present invention is to provide a vehicle tire contact load control system which can allow a vehicle to accelerate or decelerating on a split $\mu$ road surface in a stable manner.

According to the present invention, such objects can be accomplished by providing a vehicle tire contact load control system, comprising: a wheel suspension system for supporting an unsprung mass including a wheel to a sprung mass including a vehicle body; an active actuator interposed between the unsprung mass and the sprung mass; and a controller for extending the actuator at a prescribed acceleration so as to selectively apply an additional contact load to the wheel. The extended actuator may be retracted at such a time when the tire contact load is not so critical. Preferably, one of the actuators is provided for each of a plurality of wheels, and the controller is adapted to extend at least one of the actuators at a prescribed acceleration without retracting any one of the remaining actuators.

Thus, the tire contact load of each wheel can be increased at will and independently from the other wheels so that the gripping force available to each wheel can be increased as required by appropriately operating the corresponding actuator.

This can be advantageously utilized for improving the braking performance of the vehicle by reducing the braking distance or the distance over which the vehicle has to travel before coming to a stop. In particular, the present invention allows the braking force for the given road condition to be increased. Typically, an optimum result can be achieved by increasing the contact load of the rear wheels in reducing the braking distance, but if desired, the contact load of all of the wheels of the vehicle may be thus increased upon detecting a braking action of a prescribed intensity. The same principle equally applies to the case of accelerating the vehicle at an improved rate without involving the slipping of the tires. This, again, can be effectively accomplished by increasing the contact load of the driven wheels, and thereby increasing the available traction force for the given road condition.

On a split $\mu$ road surface, the optimum braking and optimum acceleration can be accomplished by increasing the contact load of the wheel which is on a relatively slippery part of the road surface. Thereby, the braking force or the traction force can be more evenly distributed between the right and left wheels, one of the actuators not only the overall braking force or the traction force, but also the stability of the vehicle can be significantly improved thereby.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
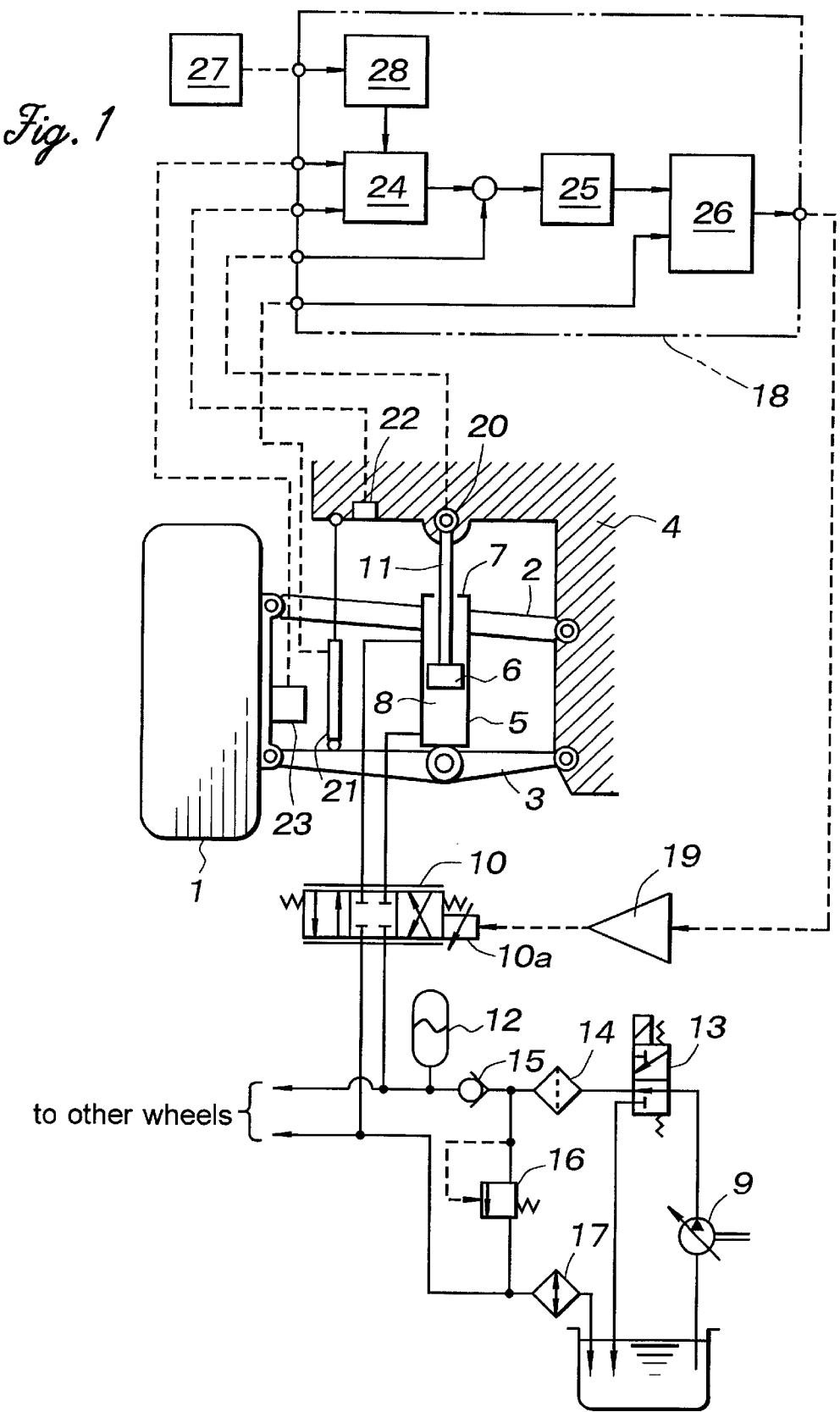
FIG. 1 is a schematic diagram showing a first embodiment of the vehicle tire contact load control system according to the present invention.

FIG. 1 schematically illustrates an essential part of an active wheel suspension system to which the present invention has been applied. A tire wheel 1 is supported by upper and lower suspension arms 2 and 3 so as to be moveable vertically with respect to a vehicle body 4. A linear actuator 5 consisting of a hydraulic cylinder is connected between the lower suspension arm 3 and the vehicle body 4. The linear actuator 5 includes a piston 6 received in a cylinder defining an upper oil chamber 7 and a lower oil chamber 8, and a thrust force is produced in a piston rod 11 by controlling the hydraulic pressures transmitted from a variable capacity oil pump 9 to these oil chambers 7 and 8 via a servo valve 10. Thereby, the relative distance between the center (axle) of the wheel 1 and the vehicle body 4 can be controlled at will.

The oil delivered from the pump 9 is initially stored in an accumulator 12 to remove the pulsating ripples in the oil pressure, and avoid shortage of the oil flow during a transient process. The pressure is then transmitted to each of the wheels 1 via the corresponding servo valve 10. This oil circuit further comprises an unloading valve 13, an oil filter 14, a check valve 15, an oil pressure regulating valve 16, and an oil cooler 17, but these components are conventional and are therefore not described here in any great detail.

The servo valve 10 controls the magnitude and direction of the hydraulic pressure applied to the hydraulic actuator 5 in a continuous manner according to a control signal supplied from an electronic control unit (ECU) 18 to a solenoid 10a of the servo valve 10 via a servo valve driver 19. The ECU 18 produces the control signal by processing output signals from a load sensor 20 interposed between the vehicle body 4 and the piston rod 11, a stroke sensor 21 interposed between the vehicle body 4 and the lower suspension arm 3, a sprung mass acceleration sensor 22 for detecting the vertical acceleration of the vehicle body 4, and an unsprung mass acceleration sensor 23 for detecting the vertical acceleration of each wheel 1 according to a control algorithm illustrated in FIG. 2.

The controller 18 receives an output from a lateral acceleration sensor 27 mounted on the vehicle body. The output signal from the lateral acceleration sensor 27 is supplied to a turning motion detecting unit 28 which analyzes the signal from the lateral acceleration sensor 27 if any significant turning maneuver has taken place by taking into account the general condition of the vehicle.

Figure 2:
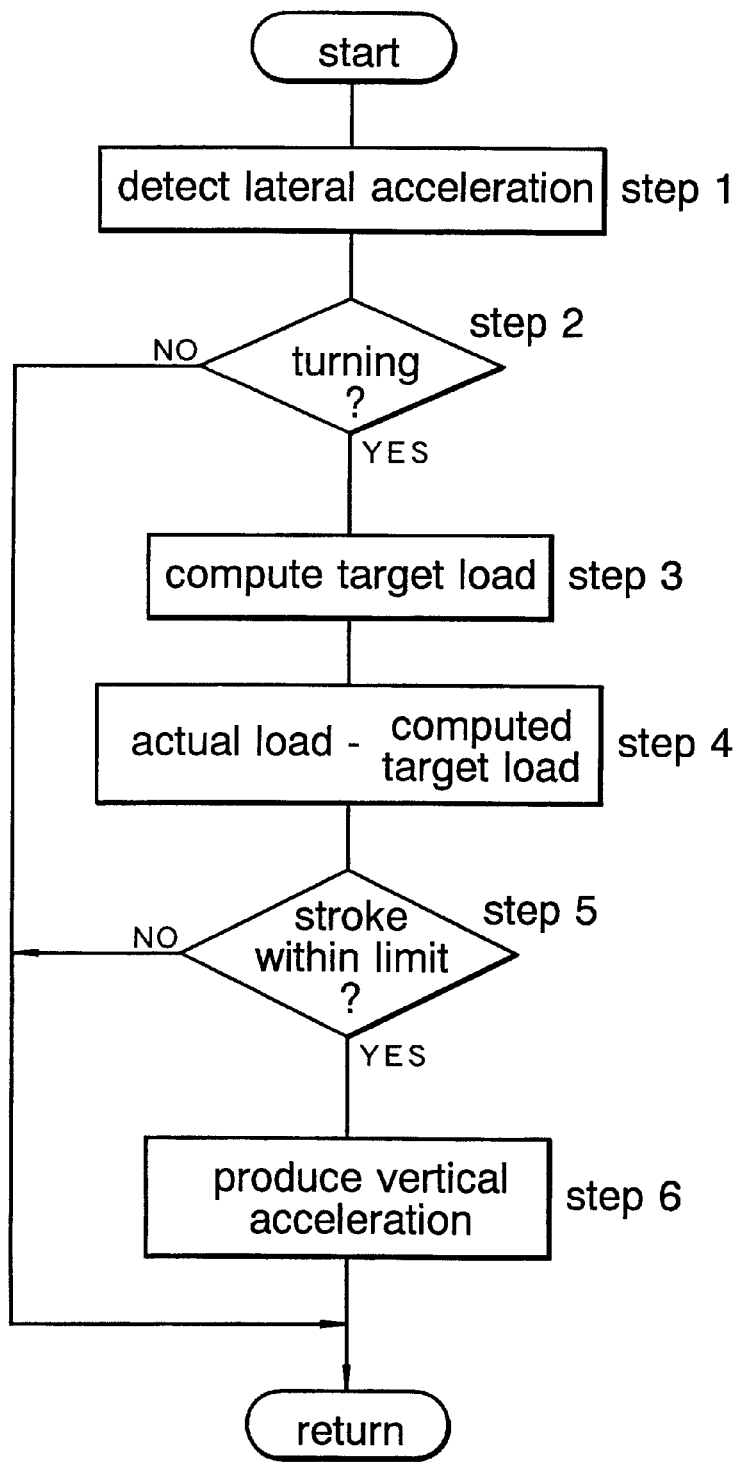
FIG. 2 is a control flow chart of the control unit of the system illustrated in FIG. 1.

The control flow of the ECU 18 is now described in the following with reference to FIGS. 1 and 2. First of all, the output signal from the lateral acceleration sensor 27 is supplied to the turning motion detecting unit 28 (step 1), and it is determined if a turning maneuver resulting in a prescribed lateral acceleration level or greater has been detected (step 2). If not, the program flow returns to the main routine, and the actuator 5 is not positively actuated. If a significant turning maneuver has been detected, then, a provisional target load is computed according to the output signals from the sprung mass acceleration sensor 22 and the unsprung mass acceleration sensor 23 which are supplied to a target load computing unit 24 (step 3). A deviation of this value from the actual load or the output signal from the load sensor 20 is computed (step 4), and is processed by a stabilizing computation unit 25 which may, for instance, consist of an integration unit. The command signal supplied from the stabilizing computation unit 25 to the servo valve driver 19 is adjusted in a displacement limiting computation unit 26 by looking up the output signal from the stroke sensor 21 so that the stroke of the actuator 5 would not exceed the maximum possible stroke (step 5). The servo valve 10 is then controlled by the adjusted command signal to appropriately actuate the actuator 5 so as to make the actual load agree with the target load. Thus, a vertical acceleration is produced in either the sprung mass or the unsprung mass so as to increase the wheel contact load (step 6).

Figure 3:
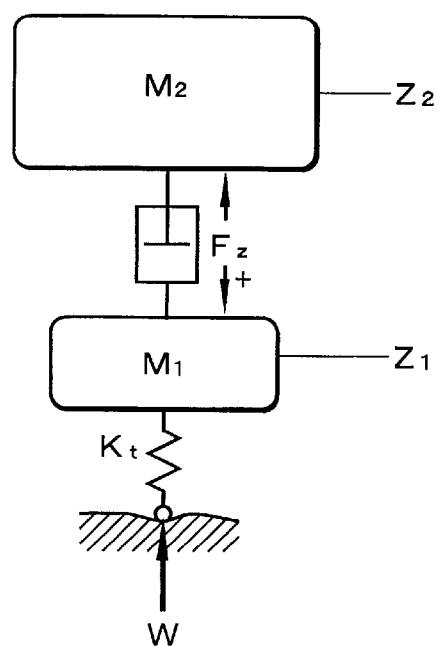
FIG. 3 is a diagram showing a mechanical model of the system shown in FIG. 1.

The working principle of this invention is described in the following with reference to FIG. 3 in which the following notations are used.

$M_2$: sprung mass $M_1$: unsprung mass $Z_2$: position of the sprung mass $Z_1$: position of the unsprung mass Kt: spring constant of the tire Fz: thrust force of the actuator Suppose that the downward direction corresponds to a positive direction. Then, the equations of motion for the sprung mass $M_2$ and the unsprung mass $M_1$ are given as follows.

$$M_2 \cdot (d^2Z_2/dt^2) = -Fz$$

$$M_1 \cdot (d^2Z_1/dt^2) + Kt \cdot Z_1 = Fz$$

Therefore, the tire contact load W can be given by the following equation.

$$W = -Kt \cdot Z_1 = -Fz + M_1 \cdot (d^2Z_1/dt^2)$$
$$= M_2 \cdot (d^2Z_2/dt^2) + M_1 \cdot (d^2Z_1/dt^2)$$

In other words, the tire contact load W can be given as a sum of the inertia forces of the sprung mass and the unsprung mass. Therefore the tire contact load W can be controlled by controlling the acceleration of extending and retracting the actuator, and thereby changing the inertia force of at least one of the sprung and unsprung masses. In particular, by controlling the individual actuator 5 for each of the wheels, it is possible to increase the contact load W of each tire at a desired timing. For instance, when the suspension stroke is 200 mm, and the actuator 5 can produce a thrust force of one ton or an acceleration of approximately 1 G, the maximum time duration of this inertia force will be approximately 0.2 seconds.

Figure 4:
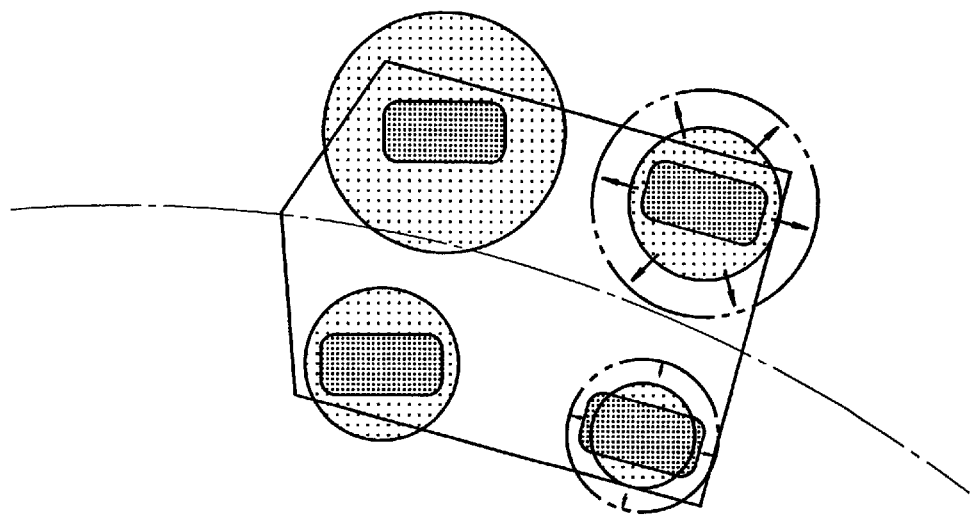
FIG. 4 illustrates a tire contact load distribution when a brake is applied in a curve according to the present invention.

FIG. 4 schematically illustrates the distribution of the tire contact load (=gripping force) of a vehicle turning a curve. The static contact load is indicated by solid circles, and the dynamic contact load or the contact load produced by the stroke of the actuator 5 is indicated by the double chain dot line. When a vehicle makes a turn at an excessive speed, the cornering force of the rear wheels tends to saturate before that of the front wheels, and this leads to an increased tendency of the vehicle to spin. This can be effectively offset by increasing the contact load of the rear wheels as illustrated in FIG. 4. This increases the gripping force of the tires of the rear wheels, and a neutral cornering property can be regained.

Figure 5:
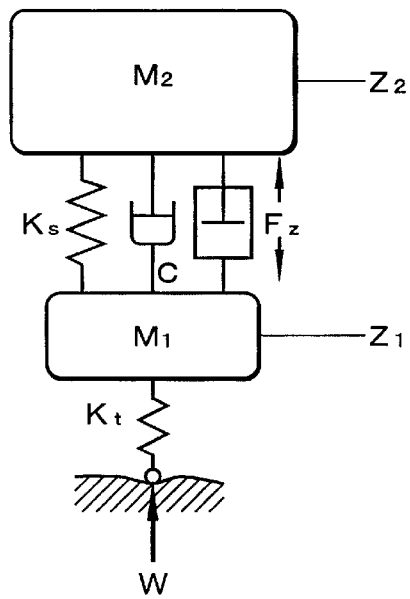
FIG. 5 is a graph showing a mechanical model of a wheel suspension system incorporated with the system shown in FIG. 1.

Typically, with the aim of minimizing the energy consumption of each actuator, the proposed active wheel suspension system uses a suspension spring for supporting the weight of the vehicle body, and a damper for producing a damping force (see FIG. 5). In this case, if Ks is the spring constant of the suspension spring, and C is the damping coefficient of the damper, the equations of motion for the sprung mass $M_2$ and the unsprung mass $M_1$ are given as follows.

$$M_2 \cdot (d^2Z_2/dt^2) + C \cdot (dZ_2/dt - dZ_1/dt) + Ks \cdot (Z_2 - Z_1) = -Fz$$

$$M_1 \cdot (d^2Z_1/dt^2) + C \cdot (dZ_1/dt - dZ_2/dt) + KS \cdot (Z_1 - Z_2) + Kt \cdot Z_1 = Fz$$

Therefore, the tire contact load W can be given by the following equation.

$$W = -Kt \cdot Z_1$$
$$= -Fz + M_1 \cdot (d^2Z_1/dt^2) + C \cdot (dZ_1/dt - dZ_2/dt) + Ks \cdot (Z_1 - Z_2)$$
$$= M_2 \cdot (d^2Z_2/dt^2) + M_1 \cdot (d^2Z_1/dt^2)$$

In other words, the tire contact load W can be likewise controlled by controlling the acceleration of extending and retracting the actuator.

Figure 6:
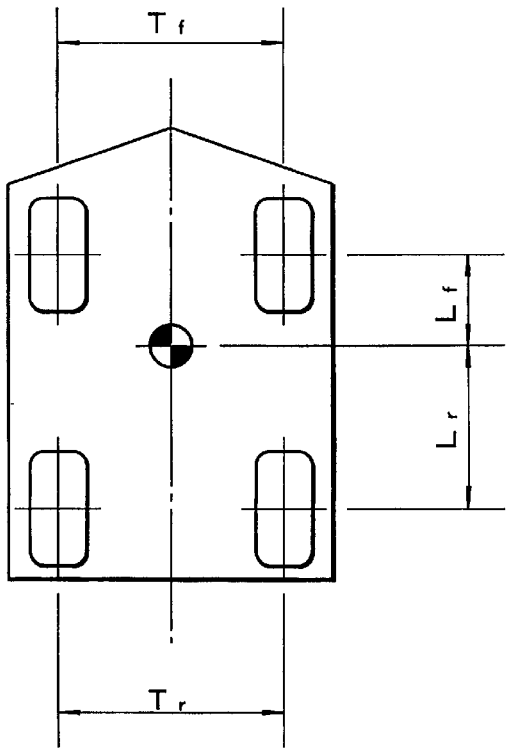
FIG. 6 is a diagram showing the various dimensions of the vehicle with respect to the gravitational center of the vehicle body.
Figure 7:
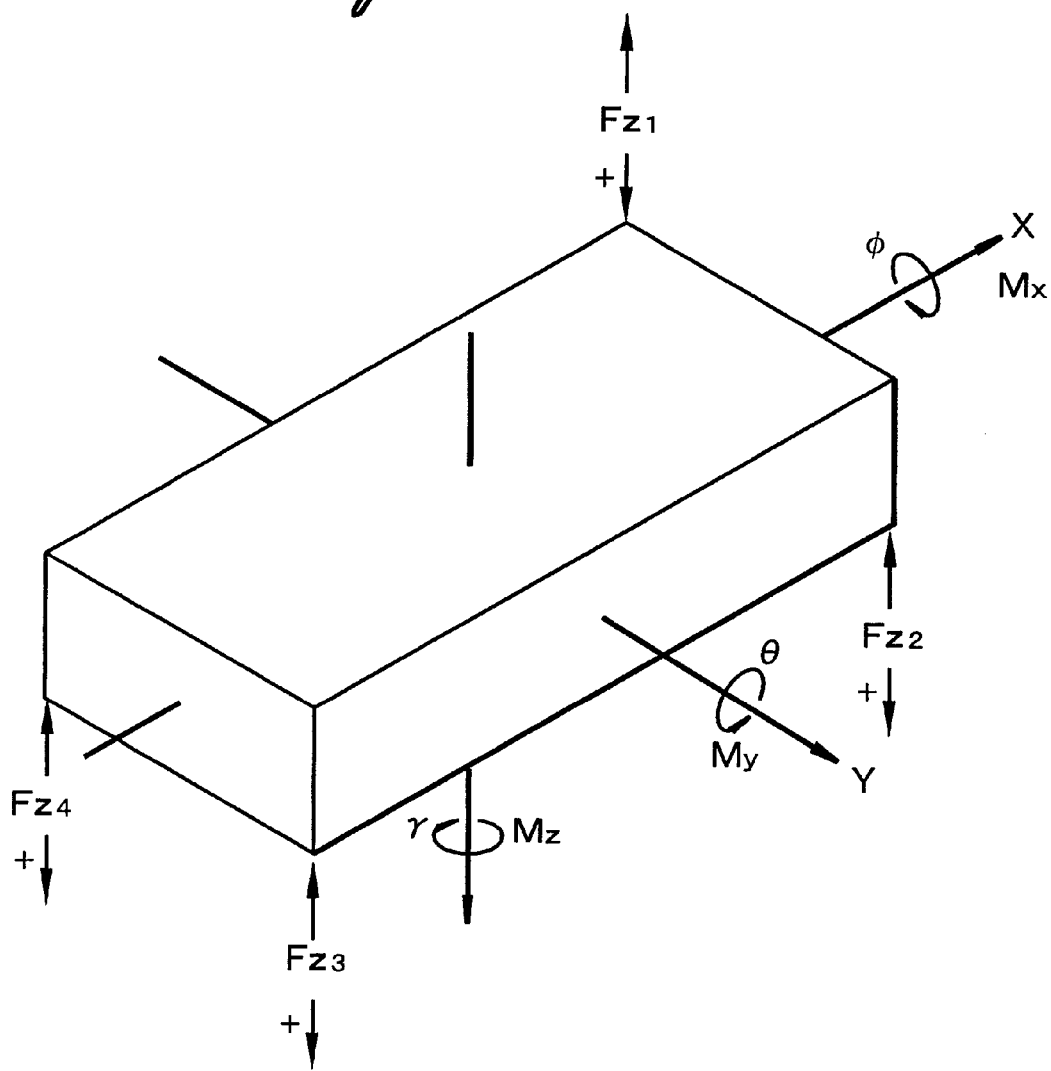
FIG. 7 is a three dimensional diagram showing the definition of the directions or the senses of the forces and moments with respect to a vehicle body.

A vehicle body can be considered as a three-dimensional rigid body, and the pitching movement and the rolling movement of the vehicle also give rise to inertial forces or inertial moments. Consider the model given in FIGS. 6 and 7, and note the following notations.

φ: roll rate

θ: pitch rate

γ: yaw rate

Lf: distance between the front axle and the gravitational center

Lr: distance between the rear axle and the gravitational center

Tf: tread width of front wheels

Tr: tread width of rear wheels

Fz1: thrust force of actuator for front left wheel

Fz2: thrust force of actuator for front right wheel

Fz3: thrust force of actuator for rear right wheel
Fz4: thrust force of actuator for rear left wheel
The rolling inertial moment Mx can be given as follows.

$$Mx=(Tf/2)\cdot(-Fz1+Fz2)-(Tr/2)\cdot(-Fz3+Fz4)$$

The pitching inertial moment My can be given as follows.

$$My=Lf\cdot(-Fz1-Fz2)-Lr\cdot(-Fz3-Fz4)$$

If the rolling and pitching moments of inertia of the vehicle body are Ix and Iy, respectively, the rolling inertial moment Mx and the pitching inertial moment Mx can be given as follows.

$$Ix\cdot(d\phi/dt)=Mx=(Tf/2)\cdot(-Fz1+Fz2)-(Tr/2)\cdot(-Fz3+Fz4)$$

$$Iy\cdot(d\theta/dt)=My=Lf\cdot(-Fz1-Fz2)-Lr\cdot(-Fz3-Fz4)$$

The vertical inertial force can be given as follows.

$$M_2\cdot(d^2Z_2/dt^2)=-Fz1-Fz2-Fz3-Fz4$$

By individually controlling the contact loads of the four wheels, it is possible to control the pitch movement and the roll movement as well as the vertical movement of the vehicle. According to the prior art, in constant because a fixed amount of force was distributed to the four wheels, it was not possible to produce any vertical inertial force, nor any significant rolling or pitching inertial moments.

Hydraulic cylinders were used for the actuators in the above described embodiment, but other actuators may also be used. Such actuators include, not exclusively, electric motors such as linear motors and moving coils, and mechanical arrangements such as cam mechanisms and spring members. Also, the various sensors may be simplified without departing from the spirit of the invention. For instance, the stroke sensor 21 may be omitted because a stroke can be computed by integrating the difference between the outputs from the acceleration sensors for the sprung mass and the unsprung mass 22 and 23. The load sensor 20 may also be omitted, because the output force of the actuator 5 may be computed from the actual values of the sprung mass and the unsprung mass, and the outputs from the acceleration sensors for the sprung mass and the unsprung mass 22 and 23. Also, the accelerations of the sprung mass and the unsprung mass may be indirectly computed from the outputs of the load sensor and the displacement sensor by defining a state estimating unit. The ECU 18 may consist of a digital computer, an analog computer or a hybrid computer.

Figure 8:
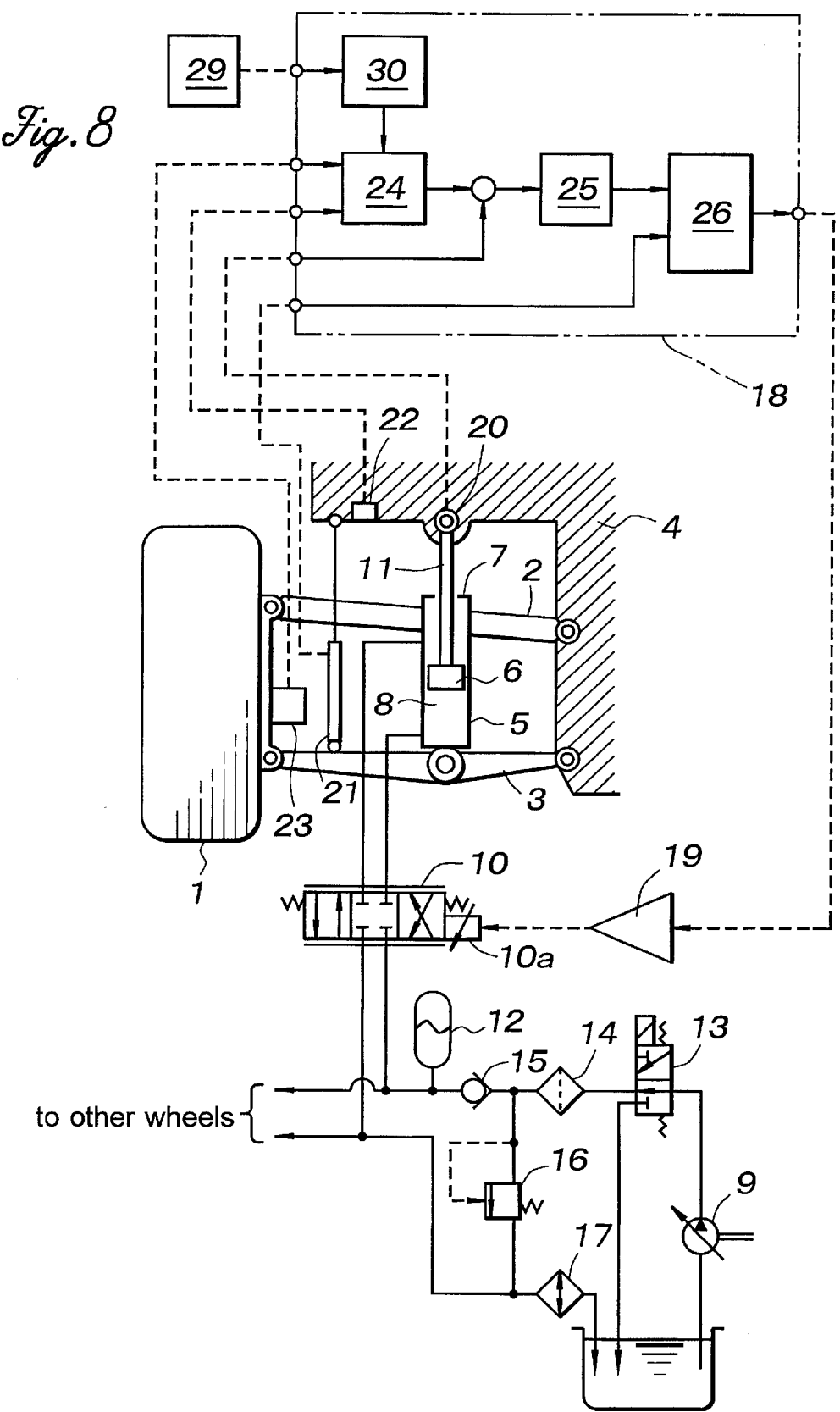
FIG. 8 is a schematic diagram showing a second embodiment of the vehicle tire contact load control system according to the present invention.

FIG. 8 shows a second embodiment of the present invention. In FIG. 8, the parts corresponding to those of the previous embodiment are denoted with like numerals. The controller 18 receives an output from a fore-and-aft acceleration sensor 29 mounted on the vehicle body. The output signal from the fore-and-aft acceleration sensor 29 is supplied to a braking determination unit 30 which analyzes the output signal from the fore-and-aft acceleration sensor 29 if any significant braking action has taken place by taking into account the general condition of the vehicle.

Figure 9:
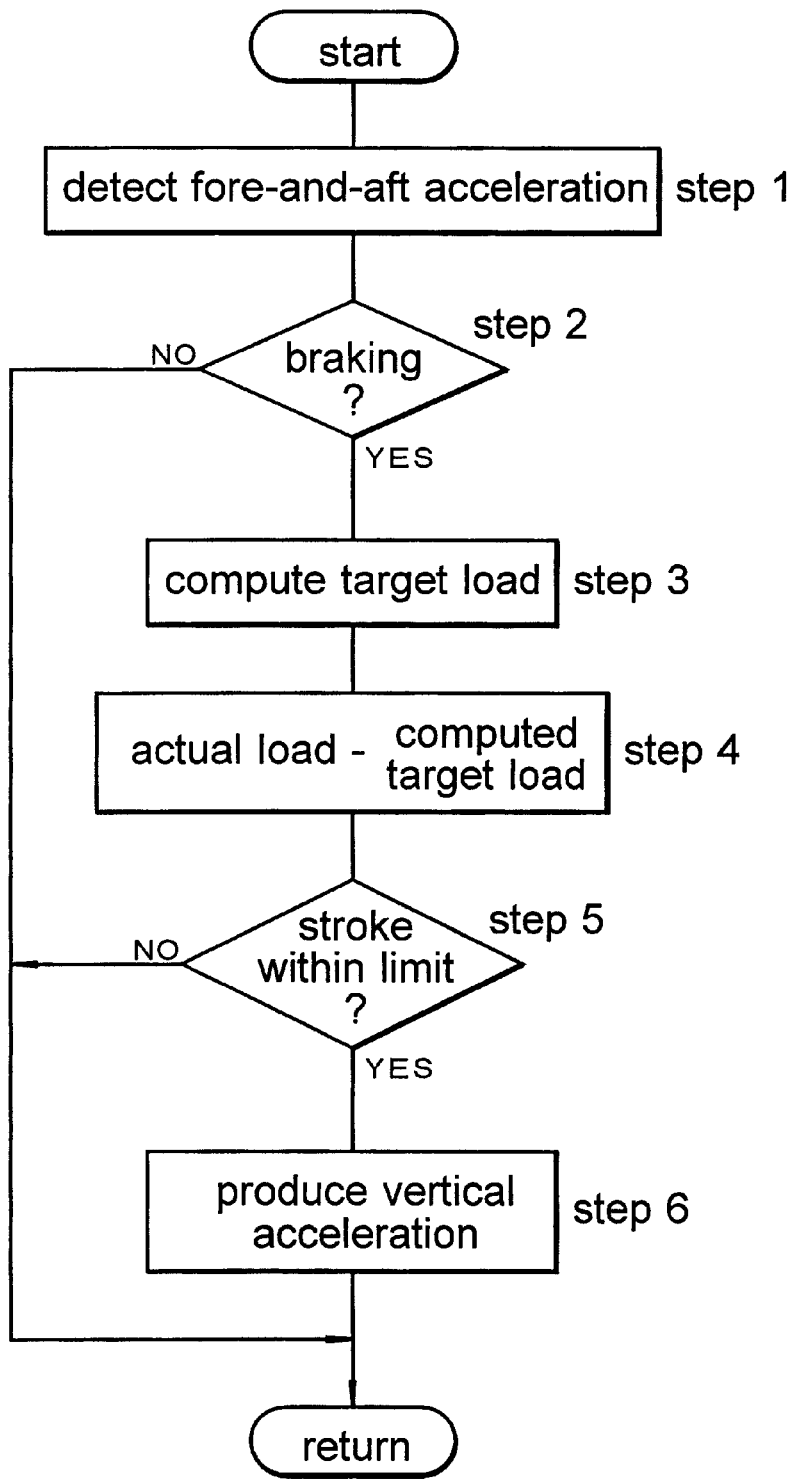
FIG. 9 is a control flow chart of the control unit of the system illustrated in FIG. 8.

FIG. 9 shows the operation of this controller 18. First of all, the output signal from the fore-and-aft acceleration sensor 29 is supplied to the braking determination unit 30 (step 1), and it is determined if a braking action resulting in a prescribed deceleration level or greater has been detected (step 2). If a braking action of such a magnitude is detected, a provisional target load is computed according to the output signals from the sprung mass acceleration sensor 22 and the unsprung mass acceleration sensor 23 which are supplied to a target load computing unit 24 (step 3). A deviation of this value from the actual load or the output signal from the load sensor 20 is computed (step 4), and is processed by a stabilizing computation unit 25. The command signal supplied from the stabilizing computation unit 25 to the servo valve driver 19 is adjusted in a displacement limiting computation unit 26 by looking up the output signal from the stroke sensor 21 so that the stroke of the actuator 5 would not exceed the maximum possible stroke (step 5). The servo valve 10 is then controlled by the adjusted command signal to appropriately actuate the actuator 5 so as to make the actual load agree with the target load. Thus, a vertical acceleration is produced in either the sprung mass or the unsprung mass so as to increase the wheel contact load (step 6). This temporarily increases the gripping force of the tire, and reduces the braking distance by raising the limit of locking up the wheel.

Figure 10:
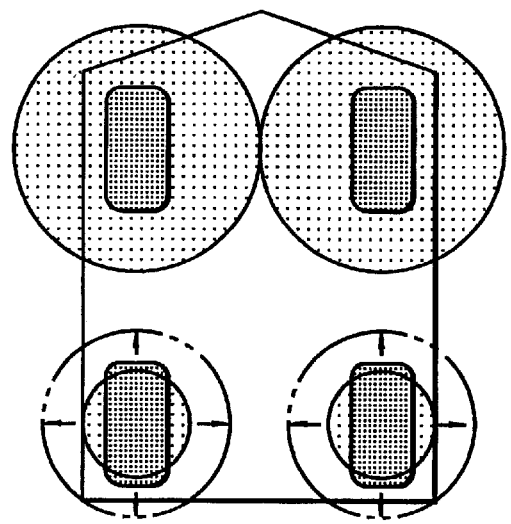
FIG. 10 is a tire contact load distribution when a brake is applied according to the present invention.

When a brake is applied to a traveling vehicle, the load on the rear wheels reduces, and the rear wheels tends to lock up easily. This is particularly the case when the vehicle is travelling a downhill road. By increasing the load of the rear wheels under such a condition by appropriately operating the actuator 5 as described above, the tendency of the rear wheels to lock up is reduced, and the braking distance or the distance the vehicle travels before coming to a stop can be substantially reduced. FIG. 10 schematically illustrates the distribution of the tire contact load (=gripping force). The static contact load is indicated by solid circles, and the dynamic contact load or the contact load produced by the stroke of the actuator 5 is indicated by the double chain dot line. When a brake is applied, the static contact load of the front wheel increases as indicated by the larger solid line circles as compared with the solid line circles drawn around the rear wheels. This tendency is even more enhanced when the vehicle is travelling a downhill slope. Because of the relatively small contact load of the rear wheels, the rear wheels tend to lock up easily. If the contact load of the rear wheels is increased by the extending stroke of the actuator as indicated by the double chain dot line of FIG. 10, the tendency of the rear wheels to lock up is reduced, and the rear wheels can thereby produce a stronger braking force. This results in a reduced braking distance.

Figure 11:
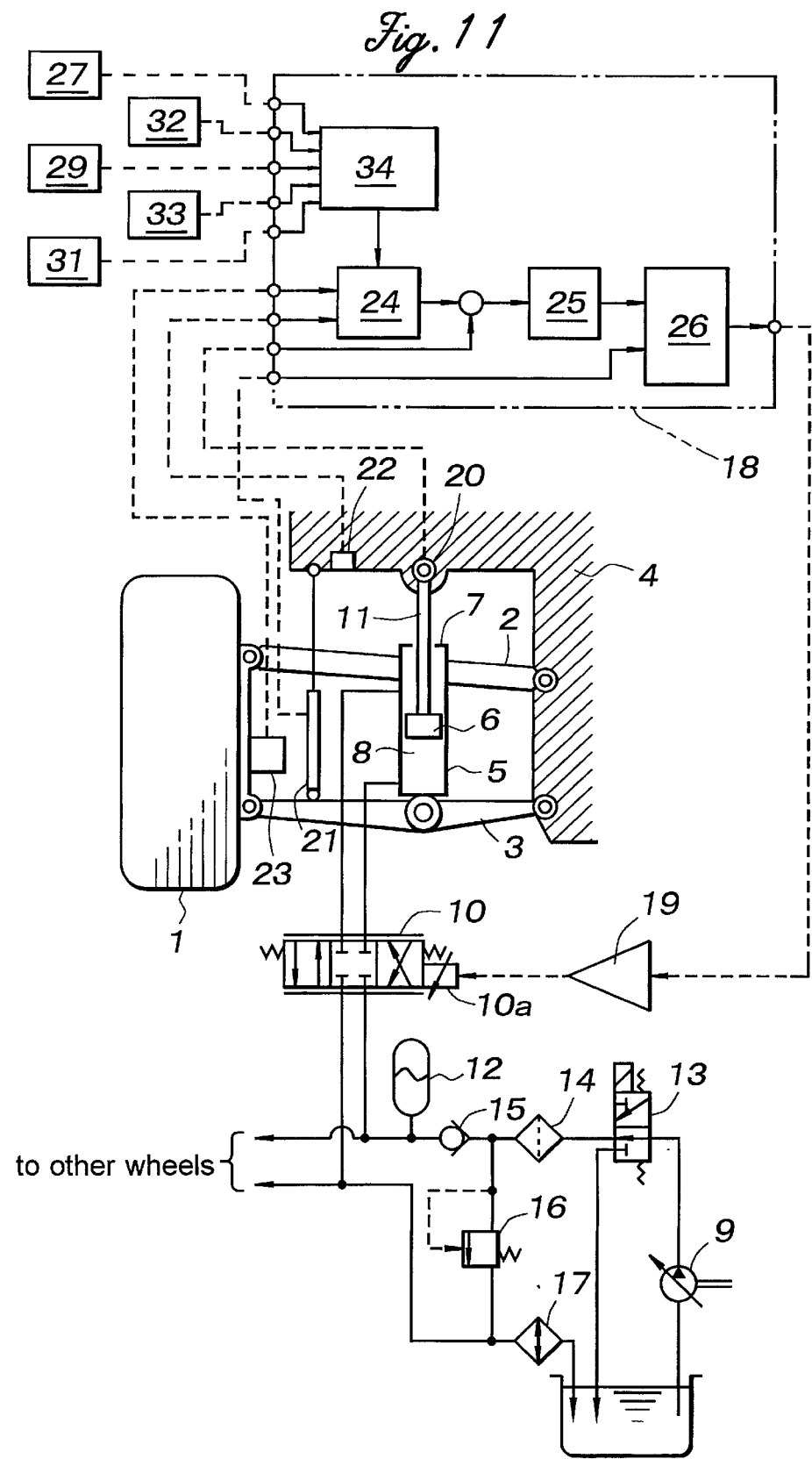
FIG. 11 is a schematic diagram showing a third embodiment of the vehicle tire contact load control system according to the present invention.

FIG. 11 shows a third embodiment of the present invention. In FIG. 11, the parts corresponding to those of the previous embodiments are denoted with like numerals. In this embodiment, the controller 18 receives output signals from a lateral acceleration sensor 27, a fore-and-aft acceleration sensor 29, a vehicle speed sensor 31, a steering angle sensor 32, and a yaw rate sensor 33. The controller 18 includes a split $\mu$ detecting unit 34 which receives and analyzes the output signals from the output signals of these sensors, and determines if the vehicle is travelling over a split $\mu$ road surface or not.

Figure 12:
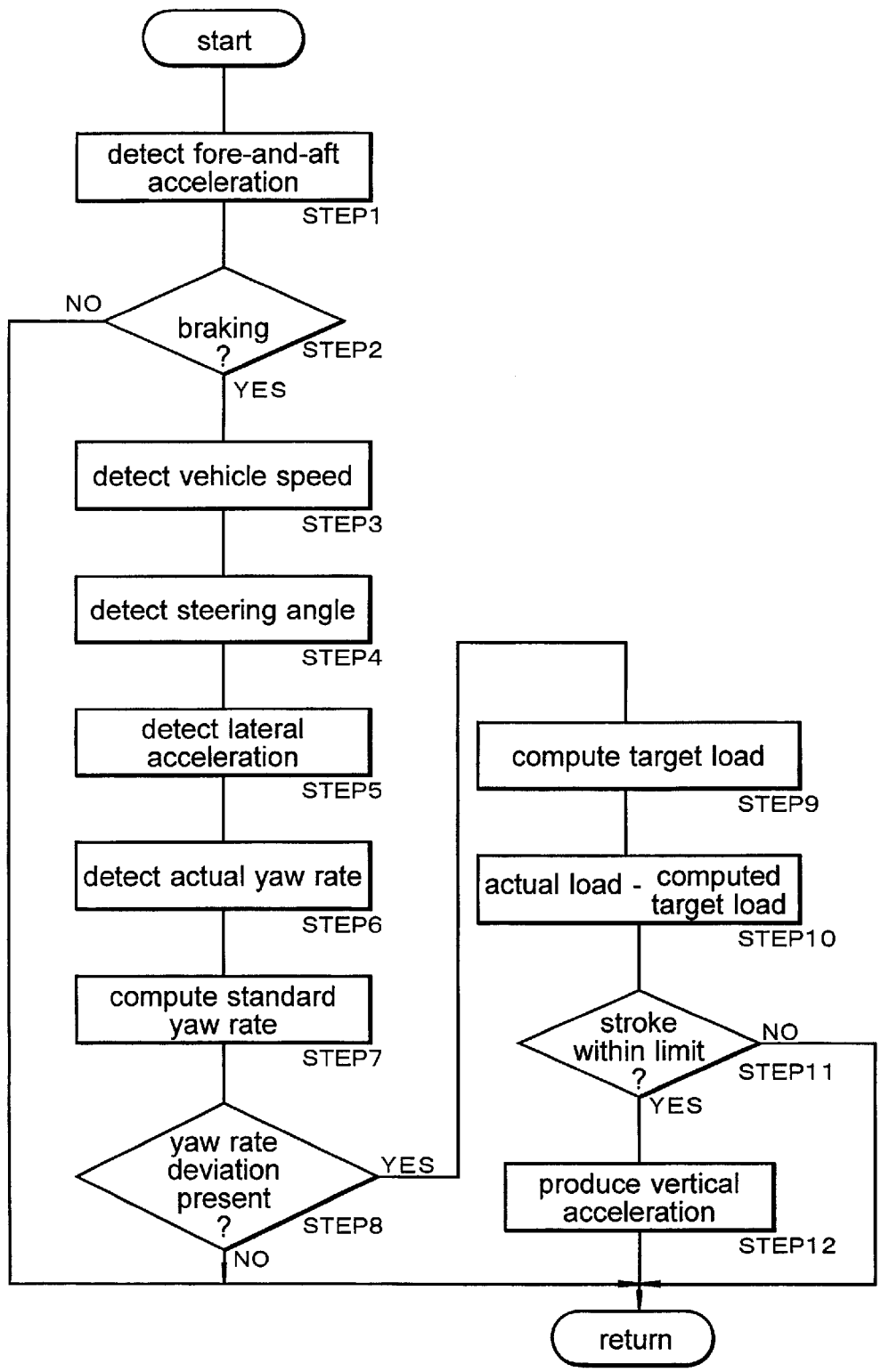
FIG. 12 is a control flow chart of the control unit of the system illustrated in FIG. 11.

The control flow of this embodiment is described in the following with reference to the flow chart of FIG. 12.

First of all, it is determined if a braking action is taking place from the output signal from the fore-and-aft acceleration sensor 29 (steps 1 and 2). If a braking action is taking place, the output signals of the lateral acceleration sensor 27, the vehicle speed sensor 31, the steering angle sensor 32, and the yaw rate sensor 33 are supplied to the split $\mu$ detecting unit 34 (steps 3 to 6). The braking action may also be detected from the rotational speed of the tires, the force applied to the brake pedal, or the hydraulic pressure of the hydraulic brake circuit.

The split $\mu$ detecting unit 34 computes a standard yaw rate for each given steering angle according to a prescribed mathematical function which takes into account the vehicle speed and the lateral acceleration (step 7). The deviation of the actual yaw rate from the standard yaw rate is computed, and it is determined if the deviation is within a prescribed threshold level (step 8). If there is any significant yaw rate deviation, it is possible that the vehicle is travelling over a split $\mu$ road surface, and an uneven braking force is hence applied by the vehicle. Therefore, a provisional target load for the actuator 5 is computed according to the output signals from the sprung mass acceleration sensor 22 and the unsprung mass acceleration sensor 23 which are supplied to a target load computing unit 24 (step 9). A deviation of this value from the actual load or the output signal from the load sensor 20 is computed (step 10), and is processed by a stabilizing computation unit 25. The command signal supplied from the stabilizing computation unit 25 to the servo valve driver 19 is adjusted in a displacement limiting computation unit 26 by looking up the output signal from the stroke sensor 21 so that the stroke of the actuator 5 would not exceed the maximum possible stroke (step 11). The servo valve 10 is then controlled by the adjusted command signal to appropriately actuate the actuator 5 so as to make the actual load agree with the target load. Thus, a vertical acceleration is produced in either the sprung mass or the unsprung mass so as to increase the wheel contact load (step 12). This temporarily increases the gripping force of the tire on the more slippery part of the road surface, and reduces the braking distance by raising the limit of locking up the wheel on the side which is easier to lock up than the tire on the other side of the vehicle body.

Figure 13:
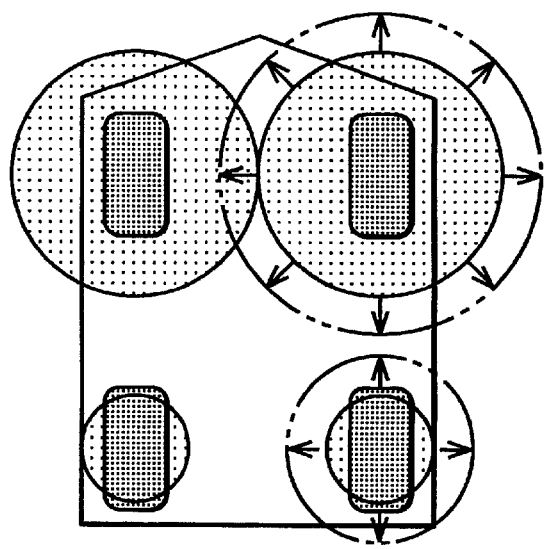
FIG. 13 illustrates a tire contact load distribution when a brake is applied on a split $\mu$ road surface according to the present invention.

As a result, the contact load of the wheels travelling over the slippery part of the road surface is increased so as to offset the uneven braking force as indicated in FIG. 13. Thus, the braking distance is reduced. In this embodiment, the presence of a split $\mu$ road surface is deduced from the comparison of the actual yaw rate with the standard yaw rate for each given steering angle when a brake is applied, and it is not necessary to detect the actual frictional coefficient $\mu$ of the road surface. Furthermore, the present invention can be applied even when the vehicle is not equipped with any ABS system. Also, the above described control is effective in not only reducing the braking distance of a vehicle traveling straight ahead, but also in ensuring the stability of a vehicle when a brake is applied in a curve.

Although the split $\mu$ condition was detected from the yaw rate in the above described embodiment, it is also possible to use the method proposed in Japanese patent laid open publication No. 2-220958, or other known methods for determining the frictional coefficient of the road surface.

Figure 14:
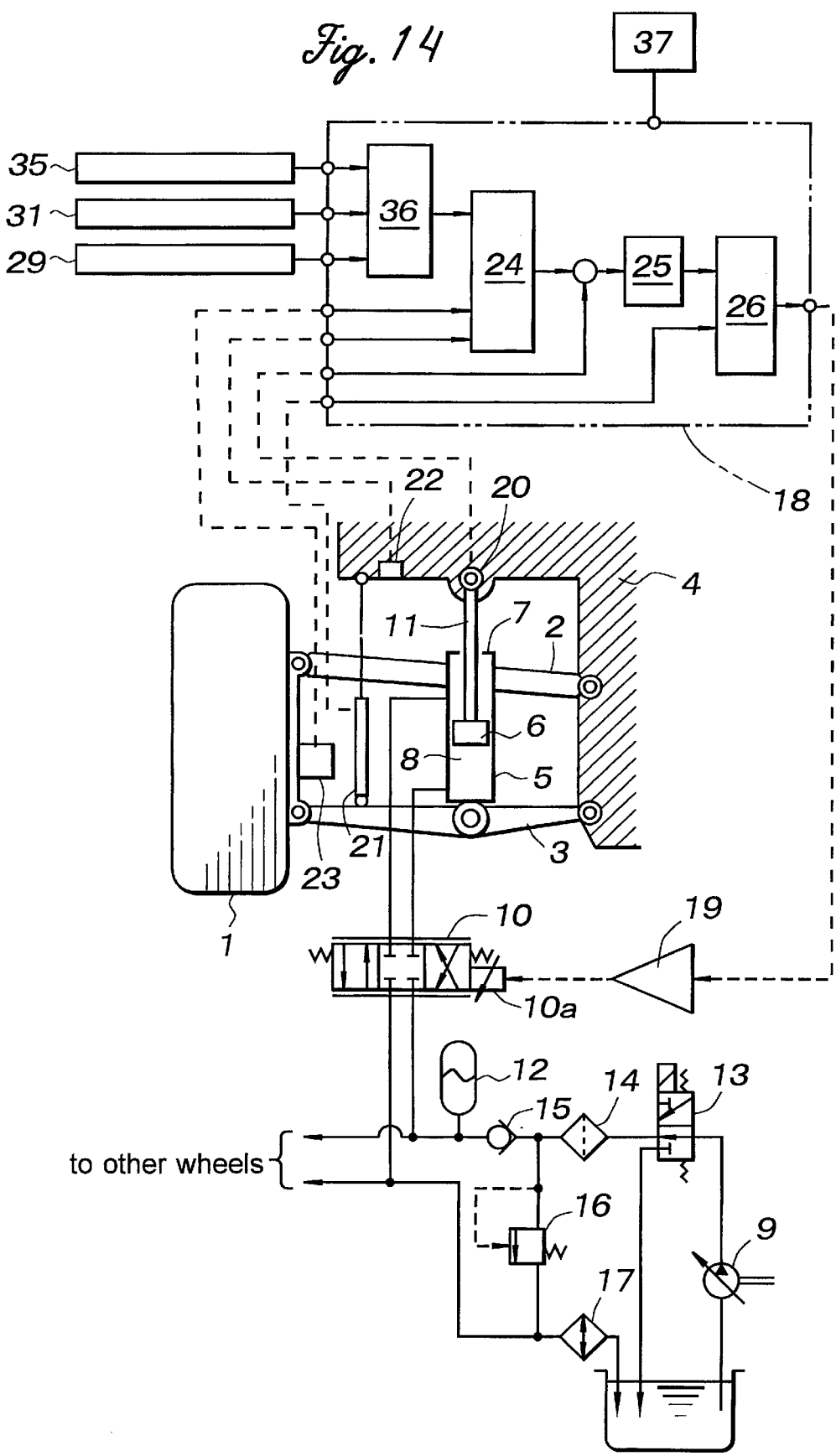
FIG. 14 is a schematic diagram showing a fourth embodiment of the vehicle tire contact load control system according to the present invention.

FIG. 14 shows a fourth embodiment of the present invention. In FIG. 14, the parts corresponding to those of the previous embodiments are denoted with like numerals. In this embodiment, the controller 18 receives output signals from a fore-and-aft acceleration sensor 29 a vehicle speed sensor 31, and a throttle opening sensor 35. The controller 18 includes a wheel slip detecting unit 36 which receives and analyzes the output signals from these sensors, and determine when each of the driven wheels is slipping at a prescribed rate or higher.

The basic mode of operation of this controller 18 is described in the following. When the wheel slip detecting unit 36 has detected a wheel slip condition due to an excessive acceleration of the vehicle for the given road condition according to the signals from the various sensors 29, 31 and 35, a provisional target load is computed according to the output signals from the wheel slip detecting unit 34, a sprung mass acceleration sensor 22 and an unsprung mass acceleration sensor 23 which are supplied to a target load computing unit 24. A deviation of this value from the actual load or the output signal from the load sensor 20 is computed, and is processed by a stabilizing computation unit 25. The command signal supplied from the stabilizing computation unit 25 to the servo valve driver 19 is adjusted in a displacement limiting computation unit 26 by looking up the output signal from the stroke sensor 21 so that the stroke of the actuator 5 would not exceed the maximum possible stroke. The servo valve 10 is then controlled by the adjusted command signal to appropriately actuate the actuator 5 so as to make the actual load agree with the target load. Thus, a vertical acceleration is produced in either the sprung mass or the unsprung mass so as to increase the wheel contact load. This temporarily increases the gripping force of the tire, and prevents the slipping of the wheel, thereby increasing the traction force available to the wheel.

Figure 15:
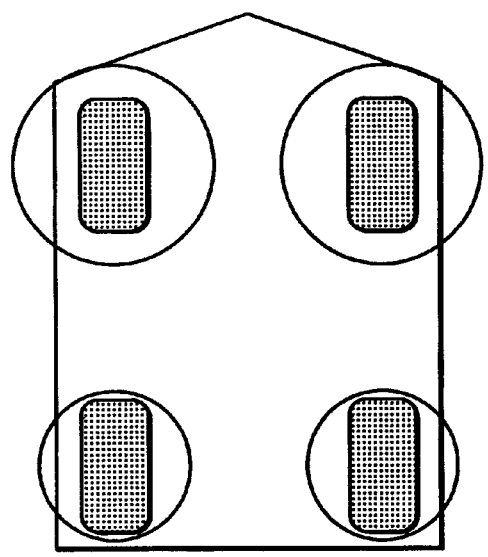
FIG. 15(a) illustrates a tire contact load distribution when a front wheel drive vehicle accelerates without the active contact load control.
FIG. 15(b) is a view similar to FIG. 15(a) with the active contact load control.
Figure 15:
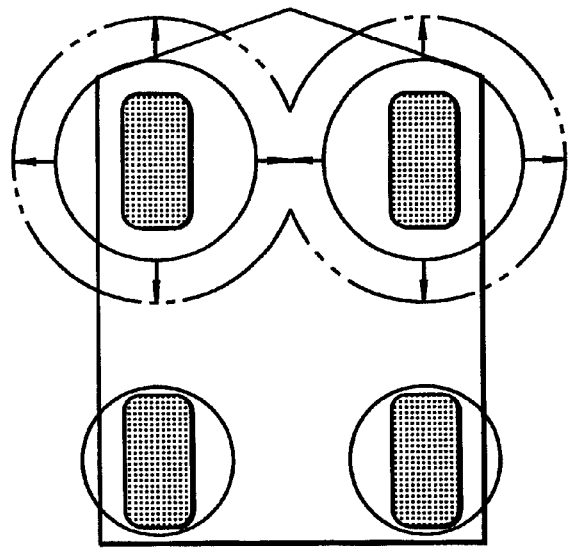
Figure 16:
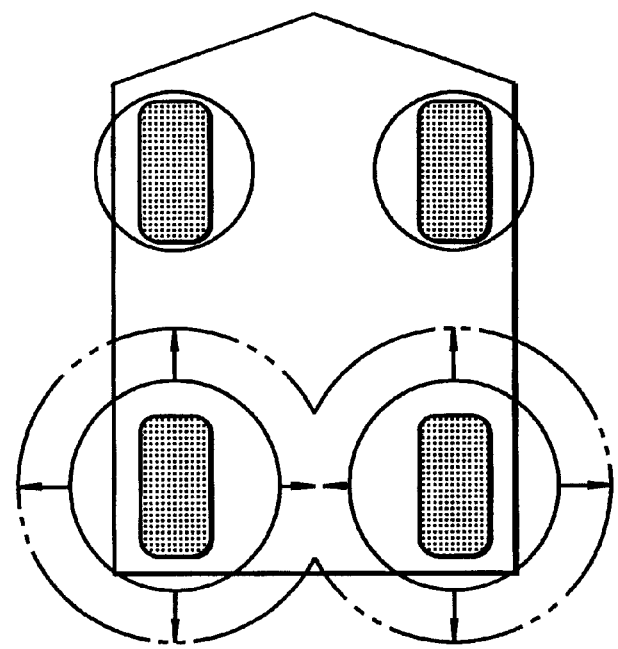
FIG. 16(a) illustrates a tire contact load distribution when a rear wheel drive vehicle accelerates with the active contact load control.
FIG. 16(b) illustrates a tire contact load distribution when a four wheel drive vehicle accelerates with the active contact load control.
Figure 16:
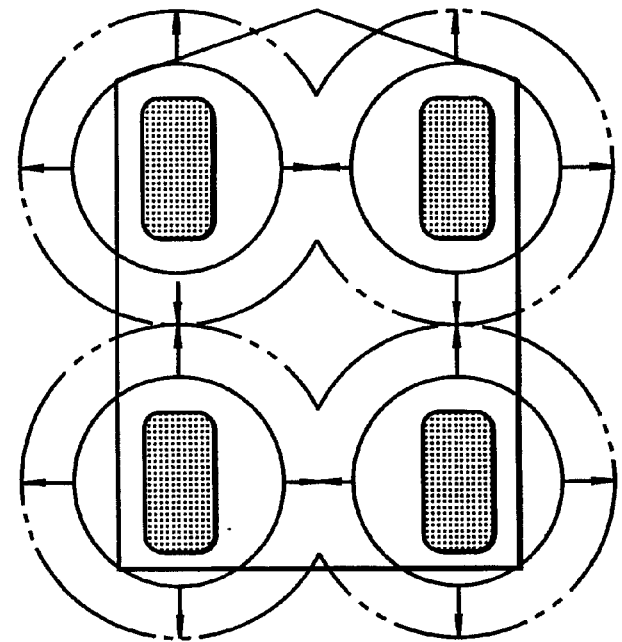

As shown in FIG. 15(*a*), in the case of a front wheel drive, front engine vehicle, the contact load of the front wheels is substantially greater than that of the rear wheels even when the vehicle is accelerating. According to the present embodiment, when the vehicle consists of a front wheel drive vehicle, when the vehicle is accelerating, the contact load of the front wheels is increased by appropriately operating the actuator 5 so as to increase the traction force of the front wheels as shown in FIG. 15(*b*). Thereby, the vehicle is allowed to accelerate at an improved rate. If the vehicle consists of a rear wheel drive vehicle, a similar advantage can be achieved by increasing the contact load of the rear wheels as shown in FIG. 16(*a*). If the vehicle consists of a four wheel drive vehicle, a similar advantage can be achieved by increasing the contact load of all the wheels as shown in FIG. 16(*b*).

Figure 17:
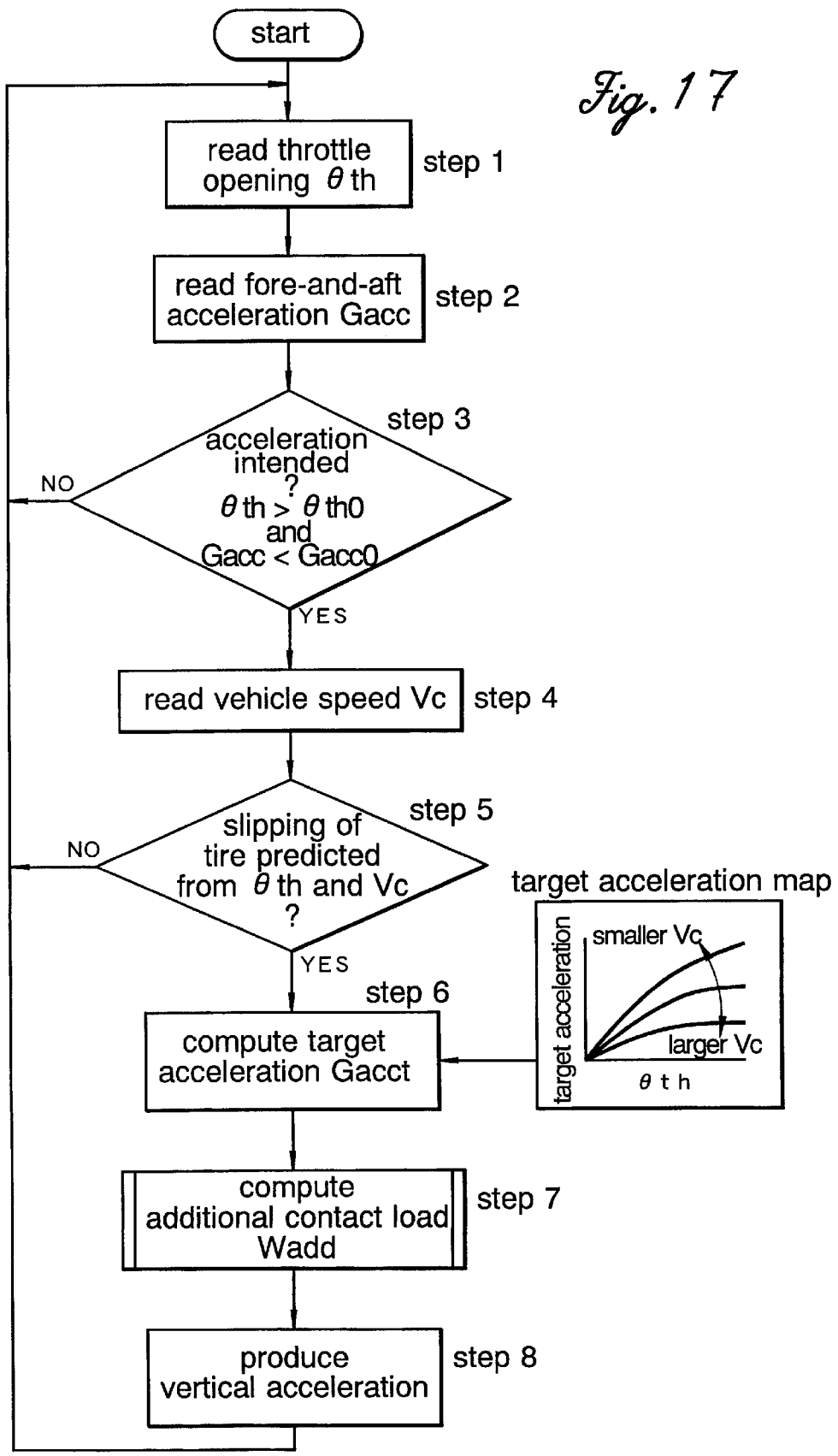
FIG. 17 is a control flow chart of the control unit of the system illustrated in FIG. 14.
Figure 18:
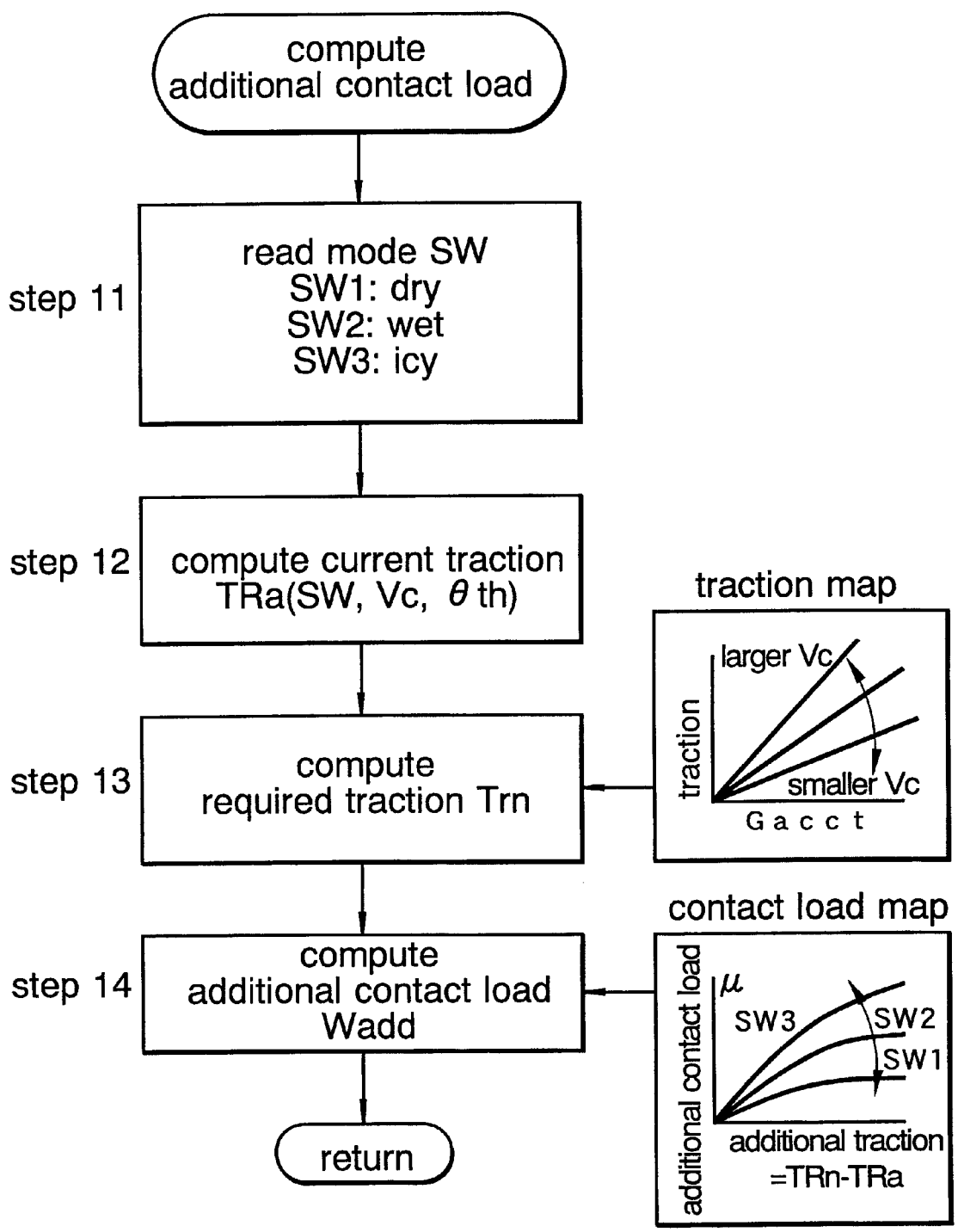
FIG. 18 is a control flow chart of the routine for computing the additional tire contact load in the flow chart of FIG. 17.

A more specific mode of operation of the controller 18 shown in FIG. 14 is now described in the following with reference to the flow chart shown in FIGS. 17 and 18.

First of all, a throttle opening $\theta$th is obtained from the throttle opening sensor 35, and a fore-and-aft acceleration Gacc is obtained from the fore-and-aft acceleration sensor 29 in steps 1 and 2. By comparing the detected throttle opening $\theta$th and fore-and-aft acceleration Gacc with a predetermined standard throttle opening $\theta$th0 and fore-and-aft acceleration Gacc0, it is determined if an attempt is being made to accelerate the vehicle by more than a prescribed degree. If no attempt is being made to accelerate the vehicle, the program flow returns to step 1. If an attempt is being made to accelerate the vehicle, the program flow advances to step 4 where a vehicle speed Vc is obtained from the vehicle speed sensor 31. The program flow then advances to step 5, and it is determined if the driven wheels are expected to start slipping or not according to the actual throttle opening $\theta$th and fore-and-aft acceleration Gacc. If the driven wheels are not expected to start slipping, the program flow returns to step 1. If the driven wheels are expected to start slipping, the program flow advances to step 6 where a target fore-and-aft acceleration Gacct is computed from the actual throttle opening $\theta$th and fore-and-aft acceleration Gacc. Then, the additional contact load Wadd which is to be produced by the operation of the actuator 5 is computed in step 7 according to a procedure described hereinafter, and the actuator 5 is actuated accordingly in step 8.

The procedure for computing the additional contact load Wadd is now described in the following with reference to FIG. 18. First of all, the state of a road condition switch 37 is read in step 11. The road condition switch 37 can produce three different values SW to indicate three different states, dry (SW=SW1), wet (SW=SW2) and snowy or icy (SW=

SW3). It can be accomplished either by a manual switch or an intelligent device which deduces the road condition from various parameters detected by appropriate sensors. The current traction force TRa is obtained in step 12 according to the state of the road condition switch 37, the vehicle speed Vc and the throttle opening θth. A target traction force TRn for the given target fore-and-aft acceleration Gacct is computed in step 13 by taking into account aerodynamic factors. The additional contact load Wadd is computed in step 14 from the desired increase in the traction force or the difference between the target traction force TRn and the current traction force TR, and the frictional coefficient $\mu$ of the road surface which is given by the state of the road condition switch 37. A larger additional contact load Wadd is produced when the road condition switch 37 is set to SW3 to indicate a low frictional coefficient $\mu$ of the road surface than when the road condition switch 37 is set to SW1 to indicate a high frictional coefficient $\mu$ of the road surface.

The road surface condition was determined by the state of the road condition switch 37 in the above described embodiment, but it is also possible to determine the road surface condition from the vehicle speed, the steering reaction and other variables. A number of methods for estimating the frictional coefficient of the road surface either directly or indirectly have been proposed. By selecting any one of such methods, it is possible to compute an additional contact load Wadd in a highly precise manner.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle tire contact load control system, comprising:
   a wheel suspension system for supporting an unsprung mass including a wheel to a sprung mass including a vehicle body;
   an active actuator interposed between said unsprung mass and said sprung mass;
   a detector for detecting at least one of a traction condition and a braking condition of said wheel; and
   a controller for extending said actuator at a prescribed acceleration so as to selectively apply an additional contact load to said wheel in response to an output of said detector.

2. A vehicle tire contact load control system according to claim 1, wherein one said actuator is provided for each of a plurality of wheels, and said controller is adapted to extend at least one of said actuators at a prescribed acceleration without retracting any one of the remaining actuators.

3. A vehicle tire load control system according to claim 2, wherein said detector detects a braking action of said vehicle, said controller extending said actuator of at least one of the wheels of the vehicle at a prescribed acceleration upon detecting a braking action of at least a prescribed intensity.

4. A vehicle tire load control system according to claim 3, wherein said controller is adapted to extend the actuators of all of the wheels of the vehicle, each at a prescribed acceleration, upon detecting a braking action of at least a prescribed intensity.

5. A vehicle tire load control system according to claim 3, wherein said controller is adapted to extend the actuators of the rear wheels of the vehicle at a prescribed acceleration upon detecting a braking action of at least a prescribed intensity.

6. A vehicle tire load control system according to claim 2, wherein said detector detects a fore-and-aft acceleration of said vehicle, said controller being adapted to extend the actuators of the driven wheels of the vehicle at a prescribed acceleration upon detecting a accelerating action of at least a prescribed intensity.

7. A vehicle tire load control system according to claim 2, wherein said detector detects substantially unequal frictional coefficients for right and left wheels, and an accelerating or decelerating action of said vehicle, said controller extending the actuator for at least one of the wheels on the side of a lower frictional coefficient at a prescribed acceleration upon detecting unequal frictional coefficients and an acceleration or deceleration action of more than a prescribed level.

8. A vehicle tire load control system according to claim 7, wherein said detector comprises a yaw rate sensor for detecting an actual yaw rate, a standard yaw rate computing unit for computing a standard yaw rate for a given vehicle speed and steering angle, and a computing unit for estimating a difference between the frictional coefficients of the right and left wheels according to a deviation of the actual yaw rate from the standard yaw rate.

9. A vehicle tire load control system according to claim 1, wherein said wheel is a driven wheel, said detector includes wheel slip detecting means for detecting slippage of the wheel, and said controller extends said actuator at a prescribed acceleration upon detecting wheel slippage of at least a prescribed intensity.

10. A vehicle tire load control system according to claim 9, wherein said wheel slip detecting means detects whether said wheel is slipping based on a degree of throttle opening and vehicle speed, said controller determines a target vehicle acceleration based on the degree of throttle opening, and said controller determines said prescribed acceleration based on a difference of said target vehicle acceleration and an actual fore-and-aft acceleration of the vehicle.

11. A wheel tire contact load control system for a vehicle, comprising:
   wheel suspension system for supporting an unsprung mass including a wheel to a sprung mass including a vehicle body;
   means for selectively applying additional contact load to said wheel at a prescribed rate, including an actuator interposed between the sprung mass and the unsprung mass;
   means for detecting at least one of a braking condition of the vehicle, a fore-and-aft acceleration of the vehicle, a slippage of at least one said wheel, and substantially unequal frictional coefficients for right and left ones of said wheels; and
   control means for controlling said contact load applying means based on an output of said detecting means;
   said control means controls said contact load applying means by extending said actuator at a prescribed acceleration.

12. A wheel tire contact load control system according to claim 11, wherein said wheel suspension means supports a plurality of the unsprung masses to the sprung mass, each said unsprung mass includes at least one said wheel, and said contact load applying means includes a plurality of actuators interposed between the sprung mass and said unsprung masses, respectively.

13. A vehicle tire load control system according to claim 11, wherein said detecting means detects the braking action of the vehicle, and said control means extends the actuator of at least one of the wheels at a prescribed acceleration upon detecting a braking action of at least a prescribed intensity.

14. A vehicle tire load control system according to claim 13, wherein said control means extends the actuator of at least the rear ones of said wheel at the prescribed acceleration upon detecting the braking action of at least the predetermined intensity.

15. A vehicle tire load control system according to claim 11, wherein said detecting means detects the fore-and-aft acceleration of the vehicle, and said control means extends the actuators of driven ones of said wheels at the prescribed acceleration upon detecting an acceleration of at least a prescribed intensity.

16. A vehicle tire load control system according to claim 11, wherein said detecting means detects the substantially unequal frictional coefficients for the right and left ones of said wheels, and also detects an acceleration or decelerating action of said vehicle, and said control means extends the actuator for at least one of the wheels on the side of a lower frictional coefficient at the prescribed acceleration upon detecting unequal frictional coefficients and an acceleration or deceleration action of more than a prescribed level.

17. A vehicle tire load vehicle system according to claim 11, wherein said detecting means detects slippage of a driven one of said wheels, and said control means extends said actuator at the prescribed acceleration upon detecting wheel slippage of at least a prescribed intensity.

\* \* \* \* \*

UNITED STATES PATENT AND TRADEMARK OFFICE
CERTIFICATE OF CORRECTION

PATENT NO.    : 6,208,920 B1
DATED         : March 27, 2001
INVENTOR(S)   : M. Izawa, Y. Shimizu, K. Oshida, H. Shibue It is certified that error appears in the above-identified patent and that said Letters Patent is hereby corrected as shown below:

Title page,
Item [57] ABSTRACT,
Line 12, change "the given" to -- a given --;
Line 13, change "a frictional" to -- the frictional --.

Column 1,
Line 55, change "release" to -- releases --.

Column 3,
Line numbered between 34 and 35, change "one of the actuators" to -- for thereby increasing --.

Column 6,
Line 35, in the equation that begins with "$M_1$", change "KS" to -- Ks --.

Column 7,
Line 25, change "constant" to -- contrast, --.

Column 8,
Line 19, change "tends" to -- tend --.

Column 9,
Lines 57-58, change "determine" to -- determines --.

Column 11,
Line 12, change "TR" to -- TRa --.

Column 12,
Line 5 (claim 6, 5th line), change "a accelerating" to -- an accelerating --.

UNITED STATES PATENT AND TRADEMARK OFFICE
CERTIFICATE OF CORRECTION

PATENT NO. : 6,208,920 B1
DATED : March 27, 2001
INVENTOR(S) : M. Izawa, Y. Shimizu, K. Oshida, H. Shibue It is certified that error appears in the above-identified patent and that said Letters Patent is hereby corrected as shown below:

Column 14,
Line 7 (claim 17, 1st line), change "load vehicle system" to -- load control system --.

Signed and Sealed this

Sixth Day of November, 2001

Attest:

NICHOLAS P. GODICI
Attesting Officer  Acting Director of the United States Patent and Trademark Office